United States Patent [19]
Abe

[11] Patent Number: 6,097,846
[45] Date of Patent: *Aug. 1, 2000

[54] IMAGE PROCESSING DEVICE WITH INVERSE QUANTIZATION AND TWO DIMENSIONAL INVERSE DISCRETE COSINE TRANSFORMATION

[75] Inventor: Nobuaki Abe, Hokkaido, Japan

[73] Assignee: Asahi Kogaku Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/730,453

[22] Filed: Oct. 15, 1996

[30] Foreign Application Priority Data

Oct. 16, 1995 [JP] Japan .................................. 7-293667

[51] Int. Cl.$^7$ ................................ G06K 9/36; G06K 9/46
[52] U.S. Cl. ............................................ 382/250; 382/251
[58] Field of Search .................................. 382/250, 248, 382/232, 233, 251, 276, 280, 281; 358/261.3, 432, 433; 348/403, 404, 405, 395; 364/725, 725.02, 725.03, 725.01, 726.01, 726.02, 726.03, 726.04, 726.05, 726.06, 726.07; 341/106

[56] References Cited

U.S. PATENT DOCUMENTS

| | | | |
|---|---|---|---|
| 4,918,742 | 4/1990 | Simonds | 382/304 |
| 5,227,875 | 7/1993 | Suu et al. | 348/384 |
| 5,299,025 | 3/1994 | Shirasawa | 358/400 |
| 5,546,336 | 8/1996 | Pechanek et al. | 364/725.03 |
| 5,550,765 | 8/1996 | Bhattacharya et al. | 364/725 |
| 5,636,152 | 6/1997 | Yang et al. | 382/248 |
| 5,825,420 | 10/1998 | Yang et al. | 348/403 |

FOREIGN PATENT DOCUMENTS 2-200082  8/1990  Japan ............................. H04N 7/133

OTHER PUBLICATIONS

One English Language Translation of "Digital Signal Processing Handbook".

*Primary Examiner*—Amelia Au
*Assistant Examiner*—Timothy M. Johnson
*Attorney, Agent, or Firm*—Greenblum & Bernstein, P.L.C.

[57] ABSTRACT

Quantized DCT coefficients Rvu are inputted to a pre-processing unit, in which pre-processed DCT coefficients are obtained by multiplying a quantization/multiplying-term table and the quantized DCT coefficients. The quantization/multiplying-term table are generated by multiplying a multiplying-term corresponding to a part of a two dimensional IDCT and a quantization coefficient. The pre-processed DCT coefficients are inputted into first through fourth stages forming a post-processing unit. The pre-processed DCT coefficients are subjected to a process corresponding to a multiplication of a DCT coefficient in the first through fourth stages. By integrating output data of the each of the first through fourth stages, the remaining part of the two dimensional IDCT is performed, so that 64 pixel values forming an 8×8 matrix are obtained.

17 Claims, 14 Drawing Sheets

FIG. 4

| x 1/4 | 0 | 1 | 2 | 3 | 4 | 5 | 6 | 7 MULTIPLIER |
|---|---|---|---|---|---|---|---|---|
| 0 | 1/2 | c[1]/2 | c[4]/2 | c[3]/2 | 1/2 | c[5]/2 | c[4,6] | c[7]/2 |
| 1 | c[1]/2 | 1/2 | c[1,2]/√2 | 1/2 | c[1]/2 | 1/2 | c[1,6]/√2 | 1/2 |
| 2 | c[2,4] | c[2,1]/√2 | c[6,2] | c[2,3]/√2 | c[1]/2 | c[2,5]/√2 | c[2,6] | c[2,7]/√2 |
| 3 | c[3]/2 | 1/2 | c[3,2]/√2 | 1/2 | c[3]/2 | 1/2 | c[3,6]/√2 | 1/2 |
| 4 | 1/2 | c[1]/2 | c[4,2] | c[3]/2 | 1/2 | c[5]/2 | c[4,6] | c[7]/2 |
| 5 | c[5]/2 | 1/2 | c[5,2]/√2 | 1/2 | c[5]/2 | 1/2 | c[5,6]/√2 | 1/2 |
| 6 | c[6,4] | c[6,1]/√2 | c[6,2] | c[6,3]/√2 | c[6,4] | c[6,5]/√2 | c[2,6] | c[6,7]/√2 |
| 7 | c[7]/2 | 1/2 | c[7,2]/√2 | 1/2 | c[7]/2 | 1/2 | c[7,6]/√2 | 1/2 |

FIG. 5 PRIOR ART

QUANTIZATION TABLE

| v \ u | 0 | 1 | 2 | 3 | 4 | 5 | 6 | 7 |
|---|---|---|---|---|---|---|---|---|
| 0 | 16 | 11 | 10 | 16 | 24 | 40 | 51 | 61 |
| 1 | 12 | 12 | 14 | 19 | 26 | 58 | 60 | 55 |
| 2 | 14 | 13 | 16 | 24 | 40 | 57 | 69 | 56 |
| 3 | 14 | 17 | 22 | 29 | 51 | 87 | 80 | 62 |
| 4 | 18 | 22 | 37 | 56 | 68 | 109 | 103 | 77 |
| 5 | 24 | 35 | 55 | 64 | 81 | 104 | 113 | 92 |
| 6 | 49 | 64 | 78 | 87 | 103 | 121 | 120 | 101 |
| 7 | 72 | 92 | 95 | 98 | 112 | 100 | 103 | 99 |

FIG. 6

QUANTIZATION-MULTIPLIER TABLE

| v \ u | 0 | 1 | 2 | 3 | 4 | 5 | 6 | 7 |
|---|---|---|---|---|---|---|---|---|
| 0 | 2 | 1.3486 | 1.6332 | 1.6629 | 3 | 2.7779 | 3.4501 | 1.4876 |
| 1 | 1.4712 | 1.5 | 2.2426 | 2.375 | 3.1876 | 7.25 | 3.9810 | 6.875 |
| 2 | 2.2865 | 2.0824 | 1.4142 | 3.2591 | 6.5328 | 5.1719 | 6.0988 | 1.7843 |
| 3 | 1.4551 | 2.125 | 2.9875 | 3.625 | 5.3006 | 10.875 | 4.4999 | 7.75 |
| 4 | 2.25 | 2.6972 | 6.0429 | 5.8203 | 8.5 | 7.5696 | 6.9679 | 1.8777 |
| 5 | 1.6667 | 4.375 | 3.1758 | 8 | 5.6251 | 13 | 4.2470 | 11.5 |
| 6 | 3.3148 | 4.2464 | 6.8943 | 4.8936 | 6.9679 | 4.5477 | 10.607 | 1.3330 |
| 7 | 1.7558 | 11.5 | 3.0269 | 12.25 | 2.7313 | 12.5 | 1.3594 | 12.375 |

FIG. 7

| x(or y) | u(or v) | | | | | | | |
|---|---|---|---|---|---|---|---|---|
| | 0 | 1 | 2 | 3 | 4 | 5 | 6 | 7 |
| 0 | c[4] | c[1] | c[2] | c[3] | c[4] | c[5] | c[6] | c[7] |
| 1 | c[4] | c[3] | c[6] | -c[7] | -c[4] | -c[1] | -c[2] | -c[5] |
| 2 | c[4] | c[5] | -c[6] | -c[1] | -c[4] | c[7] | c[2] | c[3] |
| 3 | c[4] | c[7] | -c[2] | -c[5] | c[4] | c[3] | -c[6] | -c[1] |
| 4 | c[4] | -c[7] | -c[2] | c[5] | c[4] | -c[3] | -c[6] | c[1] |
| 5 | c[4] | -c[5] | -c[6] | c[1] | -c[4] | -c[7] | c[2] | -c[3] |
| 6 | c[4] | -c[3] | c[6] | c[7] | -c[4] | c[1] | -c[2] | c[5] |
| 7 | c[4] | -c[1] | c[2] | -c[3] | c[4] | -c[5] | c[6] | -c[7] |

Columns marked: U1, U2, V2, D0

FIG. 8

|  | c[4] | c[1] | c[2] | c[3] | c[4] | c[5] | c[6] | c[7] |
|---|---|---|---|---|---|---|---|---|
| $P_{00}$ | 0 | 1 | 2 | 3 | 4 | 5 | 6 | 7 |
|  |  | c[1] | c[2] | c[3] | c[4] | c[5] | c[6] | c[7] |

| v \ u | 0 | 1 | 2 | 3 | 4 | 5 | 6 | 7 |
|---|---|---|---|---|---|---|---|---|
| c[4] / 0 | c(4,4) | c(4,1) | c(4,2) | c(4,3) | c(4,4) | c(4,5) | c(4,6) | c(4,7) |
| c[1] / 1 | c(1,4) | c(1,1) | c(1,2) | c(1,3) | c(1,4) | c(1,5) | c(1,6) | c(1,7) |
| c[2] / 2 | c(2,4) | c(2,1) | c(2,2) | c(2,3) | c(2,4) | c(2,5) | c(2,6) | c(2,7) |
| c[3] / 3 | c(3,4) | c(3,1) | c(3,2) | c(3,3) | c(3,4) | c(3,5) | c(3,6) | c(3,7) |
| c[4] / 4 | c(4,4) | c(4,1) | c(4,2) | c(4,3) | c(4,4) | c(4,5) | c(4,6) | c(4,7) |
| c[5] / 5 | c(5,4) | c(5,1) | c(5,2) | c(5,3) | c(5,4) | c(5,5) | c(5,6) | c(5,7) |
| c[6] / 6 | c(6,4) | c(6,1) | c(6,2) | c(6,3) | c(6,4) | c(6,5) | c(6,6) | c(6,7) |
| c[7] / 7 | c(7,4) | c(7,1) | c(7,2) | c(7,3) | c(7,4) | c(7,5) | c(7,6) | c(7,7) |

FIG. 9

| $P_{31}$ |   | c[4] | c[3] | c[6] | −c[7] | −c[4] | −c[1] | −c[2] | −c[5] ← U2 |
|---|---|---|---|---|---|---|---|---|---|
|   |   | 0 | 1 | 2 | 3 | 4 | 5 | 6 | 7 |
|   |   |   |   |   |   | u |   |   |   |
| c[4] | 0 | c[4,4] | c[4,3] | c[4,6] | −c[4,7] | −c[4,4] | −c[4,1] | −c[4,2] | −c[4,5] |
| c[7] | 1 | c[7,4] | c[7,3] | c[7,6] | −c[7,7] | −c[7,4] | −c[7,1] | −c[7,2] | −c[7,5] |
| −c[2] | 2 | −c[2,4] | −c[2,3] | −c[2,6] | c[2,7] | c[2,4] | c[2,1] | c[2,2] | c[2,5] |
| −c[5] | 3 | −c[5,4] | −c[5,3] | −c[5,6] | c[5,7] | c[5,4] | c[5,1] | c[5,2] | c[5,5] |
| c[4] | 4 | c[4,4] | c[4,3] | c[4,6] | −c[4,7] | −c[4,4] | −c[4,1] | −c[4,2] | −c[4,5] |
| c[3] | 5 | c[3,4] | c[3,3] | c[3,6] | −c[3,7] | −c[3,4] | −c[3,1] | −c[3,2] | −c[3,5] |
| −c[6] | 6 | −c[6,4] | −c[6,3] | −c[6,6] | c[6,7] | c[6,4] | c[6,1] | c[6,2] | c[6,5] |
| −c[1] | 7 | −c[1,4] | −c[1,3] | −c[1,6] | c[1,7] | c[1,4] | c[1,1] | c[1,2] | c[1,5] |
| ← V2 |   |   |   |   |   | v |   |   |   |

FIG. 10

| $F_{VU}$ | COSINE COEFF. | MULTP. | GROUP |
|---|---|---|---|
| F00,F04,F40,F44 | c[4,4] | 1(0) | ① |
| F02,F06,F42,F46<br>F20,F24,F60,F64 | c[4,2],c[4,6] | 2 | ② |
| F22,F26,F62,F66 | c[2,2],c[2,6],c[6,6] | 3(2) | ③ |
| F10,F30,F50,F70<br>F14,F34,F54,F74<br>F01,F03,F05,F07<br>F41,F43,F45,F47 | c[4,1],c[4,3],c[4,5],c[4,7] | 4 | ④ |
| F12,F32,F52,F72<br>F16,F36,F56,F76<br>F21,F23,F25,F27<br>F61,F63,F65,F67 | c[2,1],c[2,3],c[2,5],c[2,7]<br>c[6,1],c[6,3],c[6,5],c[6,7] | 8 | ⑤ |
| F11,F35,F53,F77<br>F17,F33,F55,F71<br>F13,F31,F57,F75<br>F15,F37,F51,F73 | c[1,1],c[1,3],c[1,5],c[1,7]<br>c[3,3],c[3,5],c[3,7]<br>c[5,5],c[5,7]<br>c[7,7] | 10(8) | ⑥ |

FIG. 11

| | | \multicolumn{8}{c}{u} | | | | | | | |
|---|---|---|---|---|---|---|---|---|---|
| | | 0 | 4 | 2 | 6 | 1 | 3 | 5 | 7 |
| v | 0 | ① | | ② | | ④ | | | |
| | 4 | | (A1) | | (A2) | | | (A4) | |
| | 2 | ② | T1 | ③ | | ⑤ | T3 | | |
| | 6 | | (A2) | | (A3) | | | (A5) | |
| | 1 | ④ | | ⑤ | | ⑥ | | | |
| | 3 | | | | | | | | |
| | 5 | | T2 | | | | T4 | | |
| | 7 | | (A4) | | (A5) | | | (A6) | |

| $O^3_{00}$ | $O^3_{01}$ | $O^3_{02}$ | $O^3_{03}$ |
|---|---|---|---|
| $O^3_{10}$ | $O^3_{11}$ | $O^3_{12}$ | $O^3_{13}$ |
| $O^3_{20}$ | $O^3_{21}$ | $O^3_{22}$ | $O^3_{23}$ |
| $O^3_{30}$ | $O^3_{31}$ | $O^3_{32}$ | $O^3_{33}$ |

T1

| $O^1_{00}$ | $O^1_{01}$ | $O^1_{02}$ | $O^1_{03}$ |
|---|---|---|---|
| $O^1_{10}$ | $O^1_{11}$ | $O^1_{12}$ | $O^1_{13}$ |
| $O^1_{20}$ | $O^1_{21}$ | $O^1_{22}$ | $O^1_{23}$ |
| $O^1_{30}$ | $O^1_{31}$ | $O^1_{32}$ | $O^1_{33}$ |

T4

| $O^4_{00}$ | $O^4_{01}$ | $O^4_{02}$ | $O^4_{03}$ |
|---|---|---|---|
| $O^4_{10}$ | $O^4_{11}$ | $O^4_{12}$ | $O^4_{13}$ |
| $O^4_{20}$ | $O^4_{21}$ | $O^4_{22}$ | $O^4_{23}$ |
| $O^4_{30}$ | $O^4_{31}$ | $O^4_{32}$ | $O^4_{33}$ |

T2

| $O^2_{00}$ | $O^2_{01}$ | $O^2_{02}$ | $O^2_{03}$ |
|---|---|---|---|
| $O^2_{10}$ | $O^2_{11}$ | $O^2_{12}$ | $O^2_{13}$ |
| $O^2_{20}$ | $O^2_{21}$ | $O^2_{22}$ | $O^2_{23}$ |
| $O^2_{30}$ | $O^2_{31}$ | $O^2_{32}$ | $O^2_{33}$ |

FIG. 14

| F02 | F06 |
|-----|-----|
| F42 | F46 |

| c(2,4) | c(6,4) |
|--------|--------|
| c(2,4) | c(6,4) |

| c(2,4) | c(6,4) |
|--------|--------|
| -c(2,4)| -c(6,4)|

| c(6,4) | -c(2,4)|
|--------|--------|
| c(6,4) | -c(2,4)|

| c(6,4) | -c(2,4)|
|--------|--------|
| -c(6,4)| c(2,4) |

| H02 | H06 |
|-----|-----|
| H42 | H46 |

| 1 | 1 |
|---|---|
| 1 | 1 |

| 1 | 1 |
|---|---|
| -1| -1|

| $\sqrt{2}-1$ | $-\sqrt{2}-1$ |
|--------------|---------------|
| $\sqrt{2}-1$ | $-\sqrt{2}-1$ |

| $\sqrt{2}-1$ | $-\sqrt{2}-1$ |
|--------------|---------------|
| $-\sqrt{2}+1$| $\sqrt{2}+1$  |

$O_{00}, -O_{03}$    $O_{10}, -O_{13}$    $O_{01}, -O_{02}$    $O_{11}, -O_{12}$
$O_{30}, -O_{33}$    $O_{20}, -O_{23}$    $O_{31}, -O_{32}$    $O_{21}, -O_{22}$

IMAGE PROCESSING DEVICE WITH INVERSE QUANTIZATION AND TWO DIMENSIONAL INVERSE DISCRETE COSINE TRANSFORMATION

BACKGROUND OF THE INVENTION

1. Field of the Invention

The present invention is related to an image signal compressing device, especially to an improvement of the processing speed at which image information, which has been compressed according to a JPEG (Joint Photographic Expert Group) algorithm and has been recorded in a recording medium, is restored to the original image information using two dimensional IDCT (inverse discrete cosine transformation).

2. Description of the Related Art

A standard algorithm for the encoding of high resolution images and the transfer of that information through telecommunication transmission channels has been recommended by the JPEG. In the algorithm recommended by the JPEG, i.e., the base line process of the JPEG algorithm, to enable a large-scale data compression, first the original image data are broken down into components on the spatial frequency axis using two-dimensional DCT (discrete cosine transformation). Thereafter, data expressed on the spatial frequency axis is quantized using a quantization table. The quantized data is then encoded using a Huffman table.

When the original image is to be restored from the image information which has been encoded and recorded in the recording medium, the encoded data is decoded and inversely-quantized, and then, the two-dimensional IDCT is applied to the inversely-quantized data.

In the inverse-quantization and in the IDCT, an enormous number of multiplications and addition-subtraction calculations are carried out. The multiplication process is more complex than the addition-subtraction calculations, and therefore, the number of multiplications has a greater effect on the calculation time.

SUMMARY OF THE INVENTION

Accordingly, an object of the invention is to provide an image processing device by which the inverse-quantization and the two-dimensional IDCT are carried out at a high speed.

According to the present invention, there is provided an image processing device, in which a quantized DCT coefficient is inversely-quantized and subjected to a two dimensional inverse discrete cosine transformation (IDCT) to restore each of a plurality of pixel values, the quantized DCT coefficient being obtained for each of a plurality of spatial frequencies by applying a two dimensional discrete cosine transformation (DCT) to original image data composed of the pixel values which are arranged in a matrix, and then quantizing the resultant two dimensional DCT coefficient using a quantization coefficient included in a quantization table, the image processing device comrprising a pre-processor, a post-processor, and a pixel value calculator.

In the pre-processor, the quantized DCT coefficients are multiplied by pre-processed coefficients generated based on the quantization coefficients and multiplying-terms corresponding to cosine coefficients used in the two dimensional IDCT, so that pre-processed DCT coefficients are obtained.

The post-processor is classified into a plurality of stages in accordance with values of the cosine coefficients. In the post-processor, calculations corresponding to the values of the cosine coefficients are applied to the pre-processed DCT coefficients to obtain output data.

The pixel value calculator classifies the pixel values into groups composed of a predetermined number of pixel values which are symmetrically disposed in the matrix and are multiplied by the cosine coefficients having the same absolute values. The pixel value calculator performs addition and subtraction calculations regarding the output data included in each of the stages in order to restore the pixel values for each of the groups.

BRIEF DESCRIPTION OF THE DRAWINGS

The present invention will be better understood from the description of the preferred embodiments of the invention set forth below, together with the accompanying drawings, in which:

FIG. 4 is a view showing multiplying terms used in spacial frequencies f(u,v);

FIG. 5 is a view showing a luminance quantization table which is recommended by the JPEG;

FIG. 6 is a view showing a quantization/multiplying-term table;

FIG. 7 is a view showing cosine values corresponding to the spatial coordinates and the spatial frequency parameter;

FIG. 8 is a view showing the cosine coefficients used to obtain the pixel value P00;

FIG. 9 is a view showing the cosine coefficients used to obtain the pixel value P31;

FIG. 10 is a view showing a table in which the DCT coefficients Fvu are classified in accordance with the cosine coefficients c[i,j] which are used when obtaining the pixel values Pyx;

FIG. 11 is a view showing a relationship between each of stages T1 through T4 of a post-process unit and spatial frequencies f(u,v) calculated in these stages T1 through T4;

FIG. 12 is a view showing output data of each of the stages T1 through T4;

FIG. 14 is a view showing plus and minus symbols when output data $O^1_{00}$, $O^1_{03}$, $O^1_{33}$ and $O^1_{33}$ are generated based on the DCT coefficients F02, F06, F42, and F46 in the first stage T1;

FIG. 15 is a view showing plus and minus symbols when pre-processing coefficients Hvu are used instead of the DCT coefficients F02, F06, F42, and F46 in FIG. 14.

DESCRIPTION OF THE PREFERRED EMBODIMENTS

Figure 1:
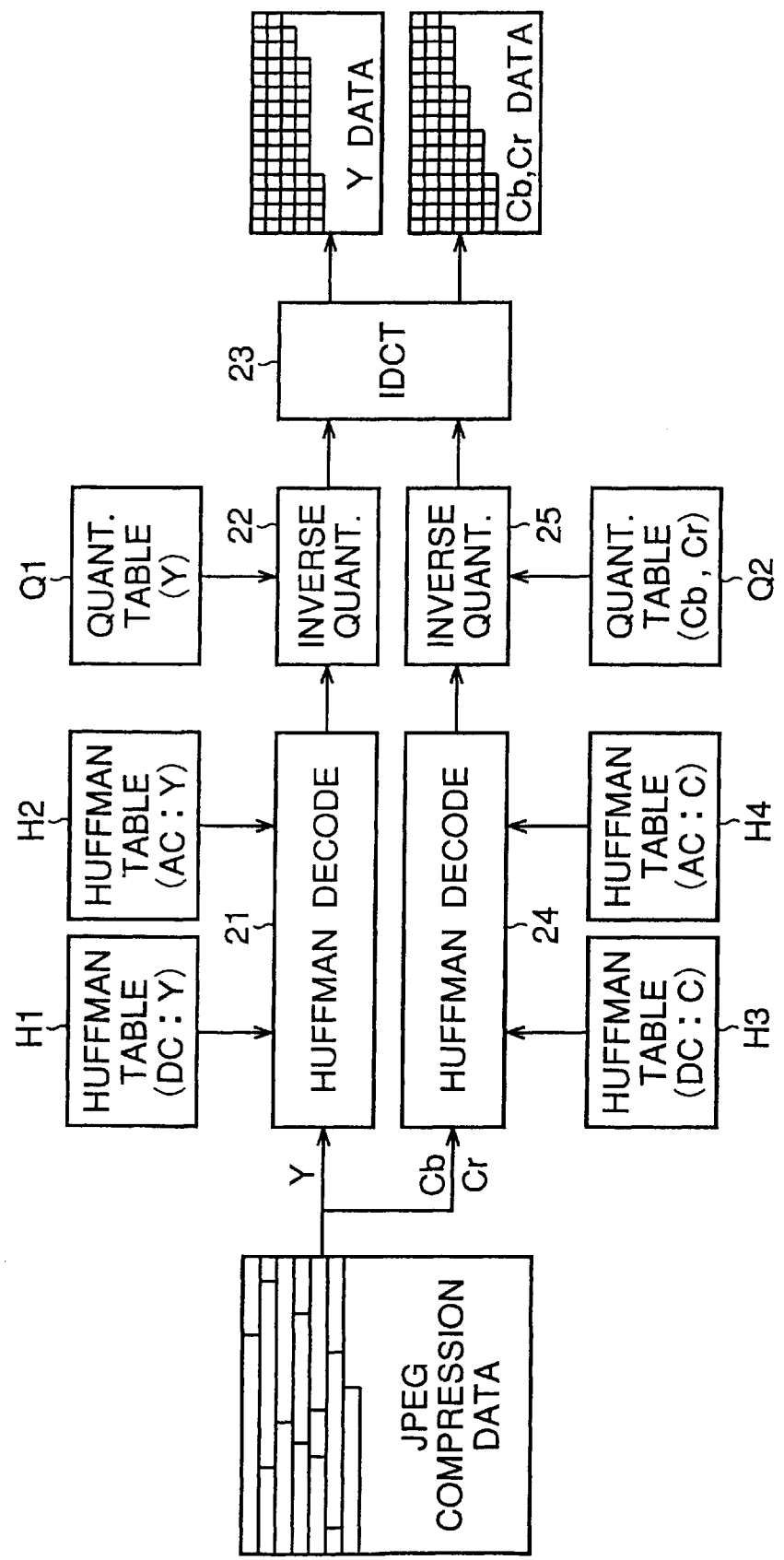
FIG. 1 is a block diagram showing a general construction of an image expansion device.

The present invention will be described below with reference to embodiments shown in the drawings.

FIG. 1 is a block diagram showing a general construction of an image signal expansion device by which image data compressed according to the JPEG algorithm are expanded by performing a Huffman decoding, an inverse-quantization, and a two-dimensional IDCT.

The JPEG compressed data recorded in a recording medium, such as an IC memory card, i.e., the encoded luminance data (Y data) and color differential data (Cb data and Cr data) are obtained by compressing pixel values of the original image data which are arranged in a matrix. Namely, in the compression process, the pixel values are subjected to a two-dimensional DCT to obtain DCT coefficients for every spatial frequency. The DCT coefficients are quantized using a quantization table composed of predetermined quantization coefficients to obtain quantized DCT coefficients, which are then Huffman-encoded, so that the encoded data are obtained.

The encoded data recorded in the recording medium are restored, by the image expansion device, to Y data, Cb data, and Cr data which are approximately equivalent to the original data which have not been compressed.

Namely, in a Huffman decoding process unit 21, the compressed quantized DCT coefficients of the Y data are Huffman-decoded using a first Huffman table H1 for a direct current component and a second Huffman table H2 for an alternating current component, so that the compressed quantized DCT coefficients are converted into quantized DCT coefficients. The quantized DCT coefficients are inversely quantized using a first quantization table Q1 in an inverse quantization process unit 22, and are subjected to a two-dimensional IDCT in an IDCT process unit 23, so that Y data are produced which are approximately equivalent to the original data which have not been compressed.

Similarly, in a Huffman decoding process unit 24, the compressed quantized DCT coefficients of the Cb and Cr data are Huffman-decoded by using a third Huffman table H3 for a direct current component and a fourth Huffman table H4 for an alternating current component, so that the compressed quantized DCT coefficients are converted into quantized DCT coefficients. The quantized DCT coefficients are inversely quantized using a second quantization table Q2 in an inverse quantization process unit 25, and are subjected to the two-dimensional IDCT in the IDCT process unit 23, so that the Cb and Cr data are produced which are approximately equivalent to the original data which have not been compressed.

In the Huffman decoding process units 21 and 24, the inverse quantization process units 22 and 25, and the IDCT process unit 23, the Y, Cb and Cr data, regarding a single frame image, are divided into a plurality of blocks, which are separately processed. Note that each of the blocks is composed of pixel data arranged in an 8×8 matrix.

Although, in this embodiment, the first quantization table Q1, by which the DCT coefficients of the Y data are inversely quantized, and the second quantization table Q2, by which the DCT coefficients of the Cb and Cr data are inversely quantized, are different from each other according to the JPEG algorithm, a single quantization table can be used for both of the data.

Figure 2:
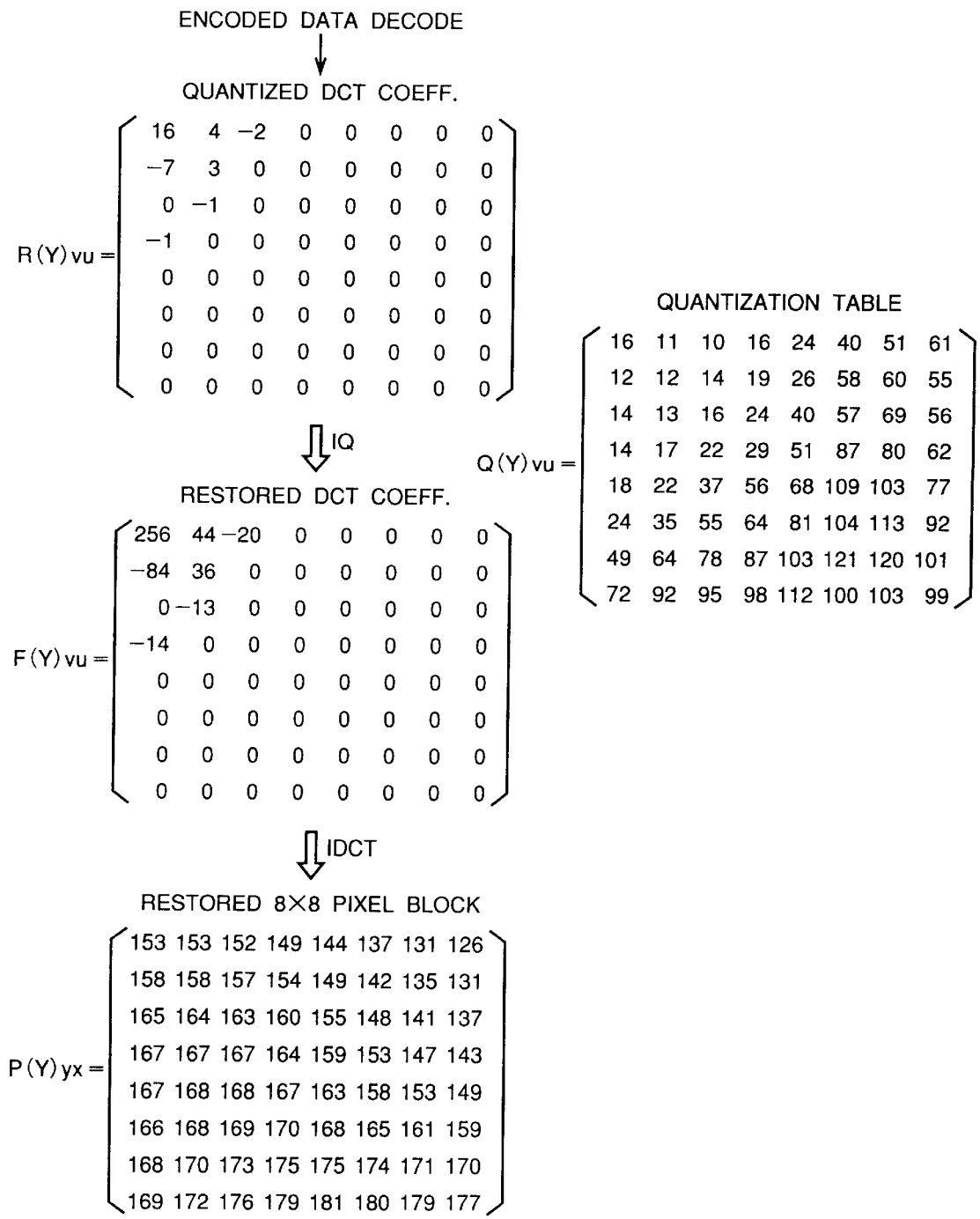
FIG. 2 is a view of an example of quantized DCT coefficients Rvu, DCT coefficients Fvu, image data Pyx, and a quantization table Qvu.

FIG. 2 shows, as an example, quantized DC coefficients Rvu of 64 spatial frequencies, restored DCT coefficients Fvu obtained by inversely quantizing the DCT coefficients Rvu, restored pixel values Pyx of an 8×8 pixel block, and a quantization table Qvu. The suffixes "v" and "u" correspond to the vertical and horizontal positions of 64DCT coefficients which are arranged in an 8×8 matrix. Values of "v" (0, 1, 2, . . . 7) range from the upper-position to the lower-position. Values of "u" (0, 1, 2, . . . 7) range from the left-position to the right-position. The suffix "y" means the vertical position of the 8×8 pixel block. Values of "y" (0, 1, 2, . . . 7) range from the upper-position to the lower-position. The suffix "x" means the horizontal position of the 8×8 pixel block. Values of "x" (0, 1, 2, . . . 7) range from the left-position to the right-position.

The quantized DCT coefficients Rvu are obtained by Huffman-decoding the compressed quantized DCT coefficients of the Y data in the Huffman-decoding process unit 21. This Huffman decoding is well known, and the description thereof is omitted.

The quantized DCT coefficients Rvu are inversely quantized in the inverse quantization processing unit 22, so that restored DCT coefficients Fvu are obtained. The quantization table Q1 used for the inverse quantization is composed of 64 quantization coefficients QVU. The formula for inversely quantizing the quantized DCT coefficients Rvu using the quantization table is defined as follows:

$$Fvu = Rvu \cdot Qvu$$

The restored DCT coefficients Fvu are subjected to the two-dimensional IDCT in the IDCT processing unit 23, so that the pixel values Pyx, which are luminance data, are obtained. The two-dimensional IDCT is expressed by the following equation (1):

$$Pyx = \frac{1}{4}\sum_{u=0}^{7}\sum_{v=0}^{7} Cu\, Cv\, Fvu \cdot \cos(2x+1)\frac{u\pi}{16} \cdot \cos(2y+1)\frac{v\pi}{16} \quad (1)$$

wherein $$Cu, Cv = \frac{1}{\sqrt{2}} : u, v = 0$$
$$= 1 \quad : u, v \neq 0$$

Figure 3:
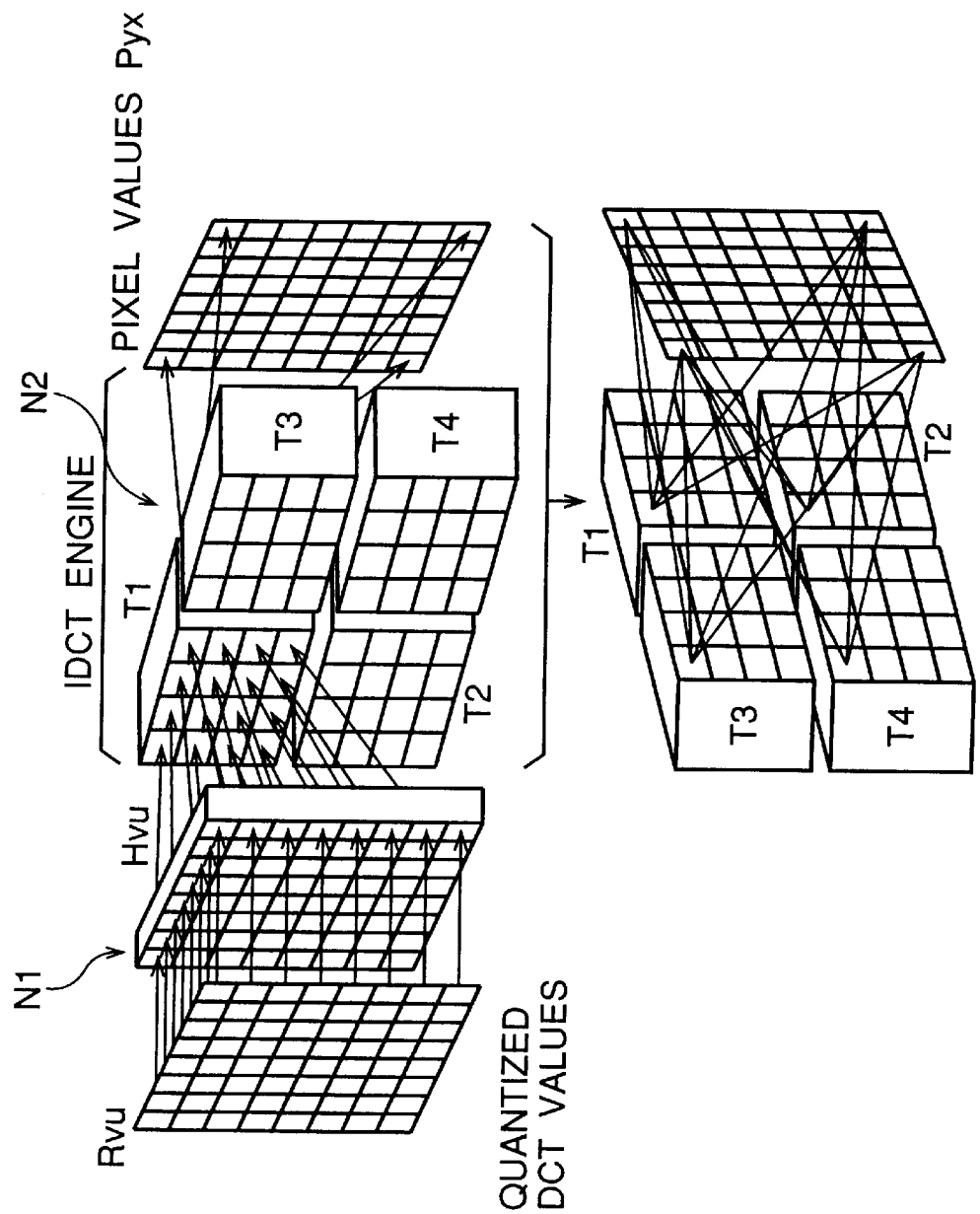
FIG. 3 is a view schematically showing a construction of an image processing device included in the image expansion device of an embodiment of the present invention.

FIG. 3 schematically shows a construction of an image processing device included in the image expansion device shown in FIG. 1. With reference to FIG. 3, an embodiment of the present invention will be described below.

The quantized DCT coefficients Rvu are multiplied by a quantization/multiplying-term table, so that the inverse quantization and a part of the two-dimensional IDCT are applied to the quantized DCT coefficients to obtain 64 pre-processed DCT coefficients Hvu. The quantization/ multiplying-term table is composed of pre-process coefficients which are obtained by multiplying the multiplying-terms, which correspond to a part of the two-dimensional IDCT, by the quantization coefficients. By introducing the quantization/multiplying-term table, a number of the multiplications in an IDCT engine, which will be described later, is reduced.

FIG. 4 shows the multiplying terms in each of the spatial frequencies f(u,v). In FIG. 4, "¼", which is shown in the upper left corner, corresponds to the coefficient ¼ included in equation (1) and indicates that each of the multiplying terms is multiplied by ¼. Cosine values are written as c[i], c[i,j] where $$c[i]=\cos(i\pi/16)$$

and $$c[i,j]=\cos(i\pi/16)\cdot\cos(j\pi/16)$$

The way in which the multiplying terms are obtained will be described later.

FIG. 5 shows the quantization table Q1 recommended by the JPEG with respect to luminance. Numerals such as "16" and "11" represent quantization coefficients in the spatial frequencies f(u,v). The quantization/multiplying-term table shown in FIG. 6 is obtained by multiplying the multiplying-terms shown in FIG. 4 by the quantization coefficients shown in FIG. 5.

The 64 pre-processed DCT coefficients Hvu are inputted into one of first through fourth stages T1, T2, T3, and T4 (see FIG. 3) forming a post-processing unit (IDCT engine) N2, in which the 64 pre-processed DCT coefficients Hvu are subjected to the remaining part of the two-dimensional IDCT, the remaining part having not been carried out in the pre-processing unit N1. In the first through fourth stages T1 through T4, 64 partially-processed DCT coefficients are obtained. The partially-processed DCT coefficients are integrated according to a predetermined algorithm when being outputted from the first through fourth stages T1 through T4, so that the 64 pixel values Pyx forming the 8×8 pixel block are obtained. Namely, the IDCT is accomplished by the multiplications of the multiplying-term (see FIG. 4) included in the quantization/multiplying-term table, the post-process in the first through fourth stages T1 through T4, and the integration process performed when the intermediate-processed DCT coefficients are outputted from the first through fourth stages T1 through T4.

The contents of the processes of the IDCT in the pre-processing unit N1 and the post-processing unit N2 will be described below.

Now, it is considered how two cosine functions in equation (1) are combined with the spatial frequency f(u,v). FIG. 7 shows a 2-dimensional array containing cosine values evaluated for each of the eight spatial frequency parameters "u" (or "v") and in each of the eight spatial coordinates "x" (or "y"). The spatial coordinate "x" corresponds to the spatial frequency parameter "u", and the spatial coordinate "y" corresponds to the spatial frequency parameter "v".

In FIG. 7, for u=0, c[4] is shown instead of c[0], since, in a one-dimensional DCT, $$Cu=1/\sqrt{2}=\cos(4\pi/16)=c[4]$$

That is, the table shown in FIG. 7 includes Cu and Cv.

As can be understood from FIG. 7, the absolute values of the cosine values are equal for x=0 and x=7, x=1 and x=6, x=2 and x=5, and x=3 and x=4, respectively. In other words, the arrangement of the absolute values is symmetric with regard to the upper and lower halves about a horizontal line D0 which is located between x=3 and x=4. By taking advantage of the symmetry, the number of multiplications in the two-dimensional IDCT is minimized, and will be described later in detail.

Two cosine values by which each of the DCT coefficients Fvu is multiplied according to equation (1) are called "cosine coefficient" in this specification. The cosine coefficient can be obtained using FIG. 7. As an example, the cosine coefficients for obtaining P00 (y=0 and x=0) and P31 (y=3 and x=1) are shown in FIGS. 8 and 9, respectively. Note that, in FIGS. 8 and 9, $$c[i,j]=\cos(i\pi/16)\cdot\cos(j\pi/16)$$

The cosine coefficients for obtaining P00 (y=0, x=0) in FIG. 8 are obtained in the following way. First, the cosine values of the row indicated by the reference marker U1 in FIG. 7 are used to fill the vertical axis indicated by the reference marker U1 on the left side of the table in FIG. 8 and the horizontal axis indicated by the reference marker U1 on the upper portion of the table, respectively. The table is completed by multiplying the corresponding cosine values of the vertical axis by that of the horizontal axis. The cosine coefficients for obtaining P31 (y=3, x=1) shown in FIG. 9 are obtained in a similar way. The sum of the products of these cosine coefficients and the DCT coefficients Fvu is obtained, and is multiplied by ¼ (i.e., equation (1) is calculated), so that P00 and P31 are obtained.

By completing cosine coefficient tables to obtain the other pixel values Pyx in a similar way as that of the tables shown in FIGS. 8 and 9, it is understood that there is a pattern regarding the cosine coefficients which are used for the same spatial frequency f(v,u). For example, the cosine coefficients of the spatial frequency f(0,0) are c[4,4] for any pixel values Pyx, and the cosine coefficients of the spatial frequency f(0,2) are c[4,2] or c[4,6] for any pixel values Pyx. Accordingly, in this embodiment, as shown in FIG. 10, the DCT coefficients Fvu are classified in accordance with the cosine coefficients c[i,j] used when obtaining each of the pixel values Pyx.

As shown by FIG. 10, the DCT coefficients F00, F04, F40, and F44 are multiplied by the cosine coefficients c[4,4]. Thus, since the same cosine coefficient is used, the number of multiplications regarding the DCT coefficients F00, F04, F40, and F44 can be considered to be one. However, since the cosine coefficient c[4,4]=½ (see FIG. 4), the actual calculation in a computer is carried out by a shift calculation. Therefore, the number of multiplications regarding the DCT coefficients F00, F04, F40, and F44 is zero. The resulting DCT coefficients are referred to as group ①.

The DCT coefficients F02, F06, F42, F46, F20, F24, F60, and F64 are multiplied by the cosine coefficients c[4,2] or c[4,6]. Therefore, the number of multiplications regarding these DCT coefficients is two. The resulting DCT coefficients are referred to as group ②.

The DCT coefficients F22, F26, F62, and F66 are multiplied by the cosine coefficients c[2,2], c[2,6], and c[6,6]. Although there are three cosine coefficients by which the DCT coefficients are multiplied, since c[6,6]=1−c[2,2], the multiplications involving either the cosine coefficients c[6,6] or c[2,2] can be eliminated and the result can be obtained from the multiplication of the other cosine coefficient. Therefore, the number of multiplications regarding the DCT coefficients F22, F26, F62, and F66 is reduced to two. The resulting DCT coefficients are referred to as group ③.

The DCT coefficients F10, F30, F50, F70, F14, F34, F54, F74, F01, F03, F05, F07, F41, F43, F45, and F47 are multiplied by the cosine coefficients c[4,1], c[4,3], c[4,5], and c[4,7]. Therefore, the number of multiplications regarding these DCT coefficients is four. The resulting DCT coefficients are referred to as group ④.

The DCT coefficients F12, F32, F52, F72, F16, F36, F56, F76, F21, F23, F25, F27, F61, F63, F65, and F67 are multiplied by the cosine coefficients c[2,1], c[2,3], c[2,5], c[2,7], c[6,1], c[6,3], c[6,5], and c[6,7]. Therefore, the number of multiplications regarding these DCT coefficients is eight. The resulting DCT coefficients are referred to as group ⑤.

The DCT coefficients F11, F35, F53, F77, F17, F33, F55, F71, F13, F31, F57, F75, F15, F37, F51, and F73 are multiplied by the cosine coefficients c[1,1], c[1,3], c[1,5], c[1,7], c[3,3], c[3,5], c[3,7], c[5,5 ], c[5,7], and c[7,7]. Although there are ten cosine coefficients by which the DCT coefficients are multiplied, since c[5,5]=1−c[3,3] and c[7,7]=1−c[1,1], the number of the multiplications is reduced by two, and therefore, the number of multiplications regarding these DCT coefficients is reduced to eight. The resulting DCT coefficients are referred to group ⑥.

According to the above, the number of the multiplications which should be carried out in the two-dimensional IDCT is:

$$(2 \times 8)+(2 \times 4)+(4 \times 16)+(8 \times 16)+(8 \times 16)=344 \quad (2)$$

In this embodiment, the number of the multiplications is less than the above, based on the table shown in FIG. 10. The reduction of the number of the multiplications will be described below.

FIG. 11 shows the relationships between the first through fourth stages T1 through T4 included in the post-processing unit N2 and the spatial frequencies f(u,v) of the pre-process DCT coefficients Hvu inputted into the stages T1 through T4. As shown in FIG. 11, the stages T1 through T4 are classified in accordance with the spatial frequencies f(u,v); i.e. the values of the cosine coefficients.

In the first stage T1, the spatial frequency parameters "u" and "v" are 0, 4, 2, or 6. In the second stage T2, the parameter "u" is 0, 4, 2, or 6, and parameter "v" is 1, 3, 5, or 7. In the third stage T3, parameter "u" is 1, 3, 5, or 7, and parameter "v" is 0, 4, 2, or 6. In the fourth stage T4, parameters "u" and "v" are 1, 3, 5, or 7.

Stage T1 is divided into a first area A1, a second area A2, and a third area A3. In the first area A1, the parameter "u" is 2 or 6 and parameter "v" is 0 or 4. In second area A2, parameter "u" is 2 or 6 and parameter "v" is 0 or 4, or the parameter "u" is 0 or 4 and parameter "v"is 2 or 6. In third area A3, the parameters "u" and "v" are 2 or 6. In the first, second, and third areas A1, A2, or A3, multiplications of the DCT coefficients, which are included in the groups ①, ②, and ③, by the cosine coefficients, are carried out.

Stage T2 is divided into a fourth area A4 and a fifth area A5. In the fourth area A4, parameter "u" is 0 or 4 and parameter "v" is 1, 3, 5, or 7. In the fifth area A5, parameter "u" is 2 or 6 and parameter "v" is 1, 3, 5, or 7. In the fourth and fifth areas A4 and A5, multiplications of the DCT coefficients, which are included in groups ④ and ⑤, by the cosine coefficients, are carried out.

Stage T3 is also divided into the fourth area A4 and the fifth area A5. In the fourth area A4, parameter "u" is 1, 3, 5, or 7 and parameter "v" is 0 or 4. In the fifth area A5, parameter "u" is 1, 3, 5, or 7 and parameter "v" is 2 or 6. In the fourth and fifth areas A4 and A5, multiplications of the DCT coefficients, which are included in groups ④ and ⑤, by the cosine coefficients, are carried out.

Stage T4 has only a sixth area A6, and is not divided into a plurality of areas as are the other stages T1 through T3. In the sixth area A6, multiplications of the DCT coefficients, which are included in the group ⑥, by the cosine coefficients, are carried out.

Equation (1) by which the pixel value P00 is obtained, is expressed below, in which the terms are arranged in the order in which the calculation is performed. Note that, in the actual calculation, the DCT coefficients Fvu are not used; instead the pre-processed DCT coefficients Hvu are used.

$$\begin{aligned}P00=&¼·(F00·c[4,4]+F04·c[4,4]+F40·c[4,4]+F44·c[4,4])+¼·(F02·c\\&[4,2]+F06·c[4,6]+F42·c[4,2]+F46·c[4,6])+¼·(F20·c[4,2]+F24·c\\&[4,2]+F60·c[4,6]+F64·c[4,6])+¼·(F22·c[2,2]+F26·c[2,6]+F62·c\\&[2,6]+F66·c[6,6])+¼·(F10·c[4,1]+F30·c[4,3]+F50·c[4,5]+F70·c\\&[4,7])+¼·(F14·c[4,1]+F34·c[4,3]+F54·c[4,5]+F74·c[4,7])+\\&¼·(F12·c[2,1]+F32·c[2,3]+F52·c[2,5]+F72·c[2,7])+¼·(F16·c[6,\\&1]+F36·c[6,3]+F56·c[6,5]+F76·c[6,7])+¼·(F01·c[4,1]+F03·c[4,\\&3]+F05·c[4,5]+F07·c[4,7])+¼·(F41·c[4,1]+F43·c[4,3]+F45·c[4,\\&5]+F47·c[4,7])+¼·(F21·c[2,1]+F23·c[2,3]+F25·c[2,5]+F27·c[2,\\&7])+¼·(F61·c[6,1]+F63·c[6,3]+F65·c[6,5]+F67·c[6,7])+¼·(F11·c\\&[1,1]+F35·c[3,5]+F53·c[3,5]+F77·c[7,7])+¼·(F17·c[1,7]+F33·c\\&[3,3]+F55·c[5,5]+F71·c[1,7])+¼·(F13·c[1,3]+F31·c[1,3]+F57·c\\&[5,7]+F75·c[5,7])+¼·(F15·c[1,5]+F37·c[3,7]+F51·c[1,5]+F73·c\\&[3,7])\end{aligned} \quad (3)$$

In the equation (3), the first through fourth terms are calculated in first stage T1. The first term $X_{00}1$ can be simplified as follows:

$$\begin{aligned}X_{00}1=&¼·(F00·c[4,4]+F04·c[4,4]+F40·c[4,4]+F44·c[4,4])=c[4,4]/\\&4·(F00+F04+F40+F44)=⅛·(F00+F04+F40+F44)\end{aligned} \quad (4)$$

The second terms $X_{00}2$ can be simplified as follows:

$$\begin{aligned}X_{00}2=&¼·(F02·c[4,2]+F06·c[4,6]+F42·c[4,2]+F46·c[4,6])=c[4,2]/\\&4·(F20+F42)+c[4,6]/4·(F06+F46)\end{aligned} \quad (5)$$

The third terms $X_{00}3$ can be simplified as follows:

$$\begin{aligned}X_{00}3=&¼·(F20·c[4,2]+F24·c[4,2]+F60·c[4,6]+F64·c[4,6])=c[4,2]/4\\&·(F20+F24)+c[4,6]/4·(F60+F64)\end{aligned} \quad (6)$$

The fourth terms $X_{00}4$ can be simplified as follows:

$$X_{00}4=¼·(F22·c[2,2]+F26·c[2,6]+F62·c[2,6]+F66·c[6,6])=c[2,6]/$$

$$4 \cdot (F26 + F62 + F22 \cdot (\sqrt{2}+1) F66 \cdot (\sqrt{2}-1) \quad (7)$$

The equation regarding the pixel value P10 and corresponding to equation (3) is as follows:

$$P10 = \frac{1}{4} \cdot (F00 \cdot c[4,4] + F04 \cdot c[4,4] - F40 \cdot c[4,4] - F44 \cdot c[4,4]) +$$

$\frac{1}{4} \cdot (F02 \cdot c[4,2] + F06 \cdot c[4,6] - F42 \cdot c[4,2] - F46 \cdot c[4,6]) + \frac{1}{4} \cdot (F20 \cdot c[4,6] + F24 \cdot c[4,6] - F60 \cdot c[4,2] - F64 \cdot c[4,2]) + \frac{1}{4} \cdot (F22 \cdot c[2,6] + F26 \cdot c[6,6] - F62 \cdot c[2,2] - F66 \cdot c[2,6]) + \frac{1}{4} \cdot (F10 \cdot c[4,3] - F30 \cdot c[4,7] - F50 \cdot c[4,1] - F70 \cdot c[4,5]) + \frac{1}{4} \cdot (F14 \cdot c[4,3] - F34 \cdot c[4,7] - F54 \cdot c[4,1] - F74 \cdot c[4,5]) + \frac{1}{4} \cdot (F12 \cdot c[2,3] - F32 \cdot c[2,7] - F52 \cdot c[2,1] - F72 \cdot c[2,5]) + \frac{1}{4} \cdot (F16 \cdot c[6,3] - F36 \cdot c[6,7] - F56 \cdot c[6,1] - F76 \cdot c[6,5]) + \frac{1}{4} \cdot (F01 \cdot c[4,1] + F03 \cdot c[4,3] + F05 \cdot c[4,5] + F07 \cdot c[4,7]) + \frac{1}{4} \cdot (-F41 \cdot c[4,1] - F43 \cdot c[4,3] - F45 \cdot c[4,5] - F47 \cdot c[4,7]) + \frac{1}{4} \cdot (F21 \cdot c[6,1] + F23 \cdot c[6,3] + F25 \cdot c[6,5] + F27 \cdot c[6,7]) + \frac{1}{4} \cdot (-F61 \cdot c[2,1] - F63 \cdot c[2,3] - F65 \cdot c[2,5] - F67 \cdot c[2,7]) + \frac{1}{4} \cdot (F11 \cdot c[1,3] - F35 \cdot c[5,7] - F53 \cdot c[1,3] - F77 \cdot c[5,7]) + \frac{1}{4} \cdot (F17 \cdot c[3,7] -$ In the equation (8), the first through fourth terms are calculated in first stage T1. The first term $X_{10}1$ can be simplified as follows:

$$X_{10}1 = \frac{1}{4} \cdot (F00 \cdot c[4,4] + F04 \cdot c[4,4] - F40 \cdot c[4,4] - F44 \cdot c[4,4]) = c[4,4]/4 \cdot (F00 + F04 - F40 - F44) = \frac{1}{8} \cdot (F00 + F04 - F40 - F44) \quad (9)$$

The second terms $X_{10}2$ can be simplified as follows:

$$X_{10}2 = \frac{1}{4} \cdot (F02 \cdot c[4,2] + F06 \cdot c[4,6] - F42 \cdot c[4,2] - F46 \cdot c[4,6]) = c[4,2]/4 \cdot (F02 - F42) + c[4,6]/4 \cdot (F06 - F46) \quad (10)$$

The third terms $X_{10}3$ can be simplified as follows:

$$\begin{aligned} x_{10}3 &= 1/4 \cdot (F20 \cdot c[4,6] + F24 \cdot c[4,6] - F60 \cdot c[4,2] - F64 \cdot c[4,2]) \quad (11) \\ &= c[4,2]/4 \cdot (F20 + F24) \cdot (\sqrt{2} - 1) - c[4,6]/4 \cdot (F60 + F64) \cdot (\sqrt{2} + 1) \end{aligned}$$

The fourth terms $X_{10}4$ can be simplified as follows:

$$\begin{aligned} x_{10}4 &= 1/4 \cdot (F22 \cdot c[2,6] + F26 \cdot c[6,6] - F62 \cdot c[2,2] - F66 \cdot c[2,6]) \quad (12) \\ &= c[2,6]/4 \cdot \left(F26 \cdot (\sqrt{2} - 1) - F62 \cdot (\sqrt{2} - 1) + F22 - F66\right) \end{aligned}$$

Comparing equation (4) with equation (9), although the plus-minus symbol of each of the DCT coefficients contained in the parenthesis is different, the parenthesis in equations (4) and (9) are multiplied by ⅛, respectively. As understood from a comparison between equations (5) and (10), between equations (6) and (11), and between equations (7) and (12), if the factors ($\sqrt{2}+1$) and ($\sqrt{2}-1$), as well as all of the symbols are neglected, the cosine coefficient which each of the DCT coefficients is multiplied by, is the same. Regarding the DCT coefficient F20, for example, is in equations (6) and (11), the DCT coefficients F20 are multiplied by c[4,2]/4, respectively.

Thus, equation (1) can be arranged in such a manner that each of the DCT coefficients is multiplied by the common multiplying-term for all of the pixel values Pyx, and thus, the multiplying-terms shown in FIG. 4 are obtained. Due to the introduction of the multiplying-term, the number of multiplications can be reduced. The calculations of the multiplying-terms are carried out in the pre-processing unit N1.

The calculation process for reducing the number of multiplications in the post-processing unit N2 will be described below.

FIG. 12 shows output data obtained by applying the IDCT process, except for the calculations of the multiplying-term, to the pre-processed DCT coefficients Hvu which is output from each of the stages T1 through T4. The output data of the stage T1 is $O^1_{00}$ through $O^1_{33}$, the output data of the stage T2 is $O^2_{00}$ through $O^2_{33}$, the output data of the stage T3 is $O^3_{00}$ through $O^3_{33}$, and the output data of the stage T4 is $O^4_{00}$ through $O^4_{33}$.

Figure 13:
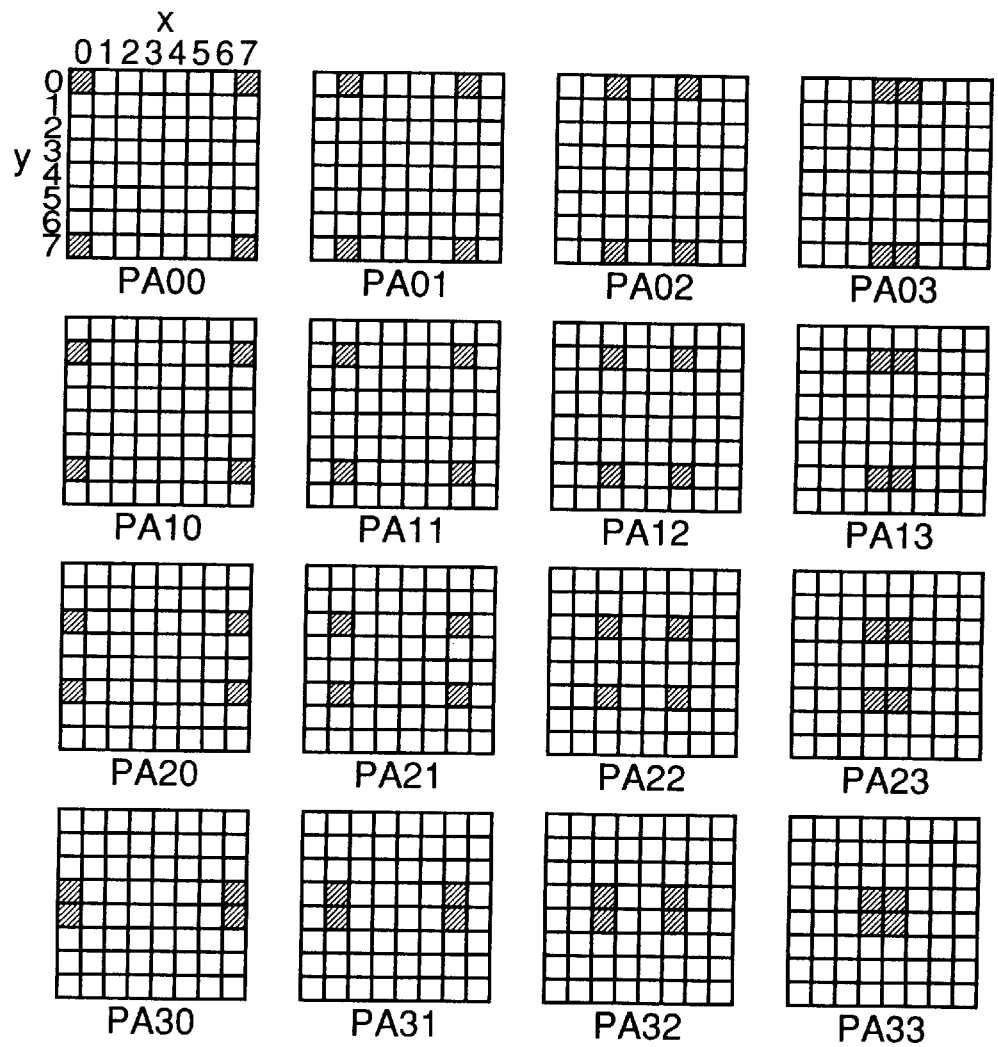
FIG. 13 is a view showing groups of pixel values Pyx obtained using the same data as that outputted from each of the states T1 through T4.

FIG. 13 shows groups of pixel values Pyx obtained using the same data as that outputted from each of the states T1 through T4. The pixel values Pyx are classified into the groups that are composed of a predetermined number of the pixel values, which are symmetrically disposed in the matrix arrangement of the original image data, and are multiplied by the cosine coefficients which have the same absolute value.

A first pixel group PA00 is composed of P00, P07, P70, and P77, which are obtained based on the output data $O^1_{00}$, $O^2_{00}$, $O^3_{00}$, and $O^4_{00}$. A second pixel group PA01 is composed of P01, P06, P71, and P76, which are obtained based on the output data $O^1_{01}$, $O^2_{01}$, $O^3_{01}$, and $O^4_{01}$. A third pixel group PA02 is composed of P02, P05, P72, and P75, which are obtained based on the output data $O^1_{02}$, $O^2_{02}$, $O^3_{02}$, and $O^4_{02}$. A fourth pixel group PA03 is composed of P03, P04, P73, and P74, which are obtained based on the output data $O^1_{03}$, $O_{203}$, $O^3_{03}$, and $O^4_{03}$.

A fifth pixel group PA10 is composed of P10, P17, P60, and P67, which are obtained based on the output data $O^1_{10}$, $O^2_{10}$, $O^3_{10}$, and $O^4_{10}$. A sixth pixel group PA11 is composed of P11, P16, P61, and P66, which are obtained based on the output data $O^1_{11}$, $O^2_{11}$, $O^3_{11}$, and $O^4_{11}$. A seventh pixel group PA12 is composed of P12, P15, P62, and P65, which are obtained based on the output data $O^1_{12}$, $O^2_{12}$, $O^3_{12}$, and $O^4_{12}$. An eighth pixel group PA13 is composed of P13, P14, P63, and P64, which are obtained based on the output data $O^1_{13}$, $O^2_{13}$, $O^3_{13}$, and $O^4_{13}$.

A ninth pixel group PA20 is composed of P20, P27, P50, and P57, which are obtained based on the output data $O^1_{20}$, $O^2_{20}$, $O^3_{20}$, and $O^4_{20}$. A tenth pixel group PA21 is composed of P21, P26, P51, and P56, which are obtained based on the output data $O^1_{21}$, $O^2_{21}$, $O^3_{21}$, and $O^4_{21}$. An eleventh pixel group PA22 is composed of P22, P25, P52, and P55, which are obtained based on the output data $O^1_{22}$, $O^2_{22}$, $O^3_{22}$, and $O^4_{22}$. A twelfth pixel group PA23 is composed of P23, P24, P53, and P54, which are obtained based on the output data $O^1_{23}$, $O^2_{23}$, $O^3_{23}$, and $O^4_{23}$.

A thirteenth pixel group PA30 is composed of P30, P37, P40, and P47, which are obtained based on the output data $O^1_{30}$, $O^2_{30}$, $O^3_{30}$, and $O^4_{30}$. A fourteenth pixel group PA31 is composed of P31, P36, P41, and P46, which are obtained based on the output data $O^1_{31}$, $O^2_{31}$, $O^3_{31}$, and $O^4_{31}$. A fifteenth pixel group PA 32 is composed of P32, P35, P42, and P45, which are obtained based on the output data $O^1_{32}$, $O^2_{32}$, $O^3_{32}$, and $O^4_{32}$. A sixteenth pixel group PA33 is composed of P33, P34, P43, and P44, which are obtained based on the output data $O^1_{33}$, $O^2_{33}$, $O^3_{33}$, and $O^4_{33}$.

A relationship between the output data $O^1_{ji}$ through $O^4_{ji}$ of each of the stages T1 through T4 and the DCT coefficients Fvu or the pre-processed DCT coefficients Hvu will be described below.

If, in equation (1), the first through fourth terms are expressed using the DCT coefficients and the fifth through sixteenth terms are expressed using $X_{00}5$ through $X_{00}16$, the following equation is obtained.

$P00 = \frac{1}{4} \cdot (F00 \cdot c[4,4] + F04 \cdot c[4,4] + F40 \cdot c4,4] + F44 \cdot c[4,4]) +$ $\frac{1}{4} \cdot (F02 \cdot c[4,2] + F06 \cdot c[4,6] + F42 \cdot c[4,2] + F46 \cdot c[4,6]) + \frac{1}{4} \cdot (F20 \cdot c[4,2] + F24 \cdot c[4,2] + F60 \cdot c[4,6] + F64 \cdot c[4,6]) + \frac{1}{4} \cdot (F22 \cdot c[2,2] + F26 \cdot c[2,6] + F62 \cdot c[2,6] + F66 \cdot c[6,6]) + X_{00}5 + X_{00}6 + X_{00}7 + X_{00}8 + X_{00}9 + X_{00}10 + X_{00}11 + X_{00}12 + X_{00}13 + X_{00}14 + X_{00}15 + X_{00}16$ (13)

Also, regarding the pixel value P03, if the first through fourth terms are expressed using the DCT coefficients and the fifth through sixteenth terms are expressed using $X_{03}5$ through $X_{03}16$, the following equation is obtained:

$P03 = \frac{1}{4} \cdot (F00 \cdot c[4,4] + F04 \cdot c[4,4] + F40 \cdot c4,4] + F44 \cdot c[4,4]) +$ $\frac{1}{4} \cdot (-F02 \cdot c[4,2] - F06 \cdot c[4,6] - F42 \cdot c[4,2] - F46 \cdot c[4,6]) + \frac{1}{4} \cdot (F20 \cdot c[4,2] + F24 \cdot c[4,2] + F60 \cdot c[4,6] + F64 \cdot c[4,6]) + \frac{1}{4} \cdot (-F22 \cdot c[2,2] - F26 \cdot c[2,6] - F62 \cdot c[2,6] - F66 \cdot c[6,6]) + X_{03}5 + X_{03}6 + X_{03}7 + X_{03}8 + X_{03}9 + X_{03}10 + X_{03}11 + X_{03}12 + X_{03}13 + X_{03}14 + X_{03}15 + X_{03}16$ (14)

Also, regarding the pixel value P30, if the first through fourth terms are expressed using the DCT coefficients and the fifth through sixteenth terms are expressed using $X_{30}5$ through $X_{30}16$, the following equation is obtained.

$P30 = \frac{1}{4} \cdot (F00 \cdot c[4,4] + F04 \cdot c[4,4] + F40 \cdot c4,4] + F44 \cdot c[4,4]) +$ $\frac{1}{4} \cdot (F02 \cdot c[4,2] + F06 \cdot c[4,6] + F42 \cdot c[4,2] + F46 \cdot c[4,6]) + \frac{1}{4} \cdot (-F20 \cdot c[4,2] - F24 \cdot c[4,2] - F60 \cdot c[4,6] - F64 \cdot c[4,6]) + \frac{1}{4} \cdot (-F22 \cdot c[2,2] - F26 \cdot c[2,6] - F62 \cdot c[2,6] - F66 \cdot c[6,6]) + X_{30}5 + X_{30}6 + X_{30}7 + X_{30}8 + X_{30}9 + X_{30}10 + X_{30}11 + X_{30}12 + X_{30}13 + X_{30}14 + X_{30}15 + X_{30}16$ (15)

Also regarding the pixel value P33, if the first through fourth terms are expressed using the DCT coefficients and the fifth through sixteenth terms are expressed using $X_{33}5$ through $X_{33}16$, the following equation is obtained.

$P33 = \frac{1}{4} \cdot (F00 \cdot c[4,4] + F04 \cdot c[4,4] + F40 \cdot c4,4] + F44 \cdot c[4,4]) +$ $\frac{1}{4} \cdot (-F02 \cdot c[4,2] - F06 \cdot c[4,6] - F42 \cdot c[4,2] - F46 \cdot c[4,6]) + \frac{1}{4} \cdot (-F20 \cdot c[4,2] - F24 \cdot c[4,2] - F60 \cdot c[4,6] - F64 \cdot c[4,6]) + \frac{1}{4} \cdot (F22 \cdot c[2,2] + F26 \cdot c[2,6] + F62 \cdot c[2,6] + F66 \cdot c[6,6]) + X_{33}5 + X_{33}6 + X_{33}7 + X_{33}8 + X_{33}9 + X_{33}10 + X_{33}11 + X_{33}12 + X_{33}13 + X_{33}14 + X_{33}15 + X_{33}16$ (16)

In the calculations regarding the DCT coefficients F02, F06, F42, and F46 which are the second terms in equations (13) through (16), respectively, the symbol of the second terms of the pixel values P00 and P30 is plus and the symbol of the second terms of the pixel values P03 and P33 is minus. Namely, the symbol of $O^1_{00}$, $O^1_{03}$, $O^1_{30}$, and $O^1_{33}$ obtained in stage T1 are plus, minus, plus, and minus, respectively. Similarly, by checking the symbols of the second terms regarding the other pixel values Pyx, the relationship shown in FIG. 14 is obtained. As described above, in the post-processing unit N2, the DCT coefficients Fvu are not used, but the pre-processed DCT coefficients Hvu are used. Therefore, the cosine coefficients shown in FIG. 14 can be converted into 1, √2−1, and √2+1, as shown in FIG. 15.

By checking the coefficients, which the DCT coefficients Fvu are multiplied by, regarding the first, third, and fourth terms of the equations (13) through (16), the output data $O^1_{00}$ through $O^1_{33}$ the first stage T1 are obtained as follows:

$O^1_{00} = (H00 + H04 + H40 + H44) +$
$(H02 + H06 + H42 + H46) + (H20 + H24 + H60 + H64) +$
$(H22 + H26 + H62 - H66) + (H22 + H66) \cdot \sqrt{2}$ $O^1_{03} = (H00 + H04 + H40 + H44) -$
$(H02 + H06 + H42 + H46) + (H20 + H24 + H60 + H64) -$
$(H22 + H26 + H62 - H66) - (H22 + H66) \cdot \sqrt{2}$ $O^1_{30} = (H00 + H04 + H40 + H44) +$
$(H02 + H06 + H42 + H46) - (H20 + H24 + H60 + H64) -$
$(H22 + H26 + H62 - H66) - (H22 + H66) \cdot \sqrt{2}$ $O^1_{33} = (H00 + H04 + H40 + H44) - (H02 + H06 + H42 + H46) -$
$(H20 + H24 + H60 + H64) +$
$(H22 + H26 + H62 - H66) + (H22 + H66) \cdot \sqrt{2}$ $O^1_{10} = (H00 + H04 - H40 - H44) + (H02 + H06 - H42 - H46) -$
$(H20 + H24 + H60 + H64) + (H20 + H24 - H60 - H64) \cdot \sqrt{2} +$
$(H22 + H26 - H62 - H66) + (H26 - H62) \cdot \sqrt{2}$ $O^1_{13} = (H00 + H04 - H40 - H44) - (H02 + H06 - H42 - H46) -$
$(H20 + H24 + H60 + H64) + (H20 + H24 - H60 - H64) \cdot \sqrt{2} -$
$(H22 - H26 - H62 - H66) - (H26 - H62) \cdot \sqrt{2}$ $O^1_{20} = (H00 + H04 - H40 - H44) + (H02 + H06 - H42 - H46) +$
$(H20 + H24 + H60 + H64) - (H20 + H24 - H60 - H64) \cdot \sqrt{2} -$
$(H22 - H26 - H62 - H66) - (H26 - H62) \cdot \sqrt{2}$ $O^1_{23} = (H00 + H04 - H40 - H44) - (H02 + H06 - H42 - H46) +$
$(H20 + H24 + H60 + H64) - (H20 + H24 - H60 - H64) \cdot \sqrt{2} +$
$(H22 - H26 - H62 - H66) + (H26 - H62) \cdot \sqrt{2}$ As described above, in the first stage T1, the six kinds of multiplications described below are carried out. Namely, $(H22 + H66) \cdot \sqrt{2}$ $(H20 + H24 - H60 - H64) \cdot \sqrt{2}$ $(H26 - H62) \cdot \sqrt{2}$ $(H02 - H06 + H42 - H46) \cdot \sqrt{2}$ $(H02 - H06 - H42 - H46) \cdot \sqrt{2}$ $(H20 - H24 - H60 + H64) \cdot \sqrt{2}$ On the other hand, in a comparative example, in which this embodiment is not used, with reference to equation (2), the number of multiplications carried out in the first stage T1 is (2·8)+(2·4)=24. Conversely, in this embodiment, the multiplication is performed six times for obtaining the output data $O^1{}_{00}$ through $O^1{}_{33}$ in the first stage T1, and each result of the multiplications is used for obtaining the other output data. Namely, according to this embodiment, the number of the multiplications is reduced to 6.

In the second, third, and fourth stages T2, T3, and T4, the output data $O^2{}_{00}$ through $O^2{}_{33}$, $O^3{}_{00}$ through $O^3{}_{33}$, and $O^4{}_{00}$ through $O^4{}_{33}$ are obtained similarly to the above.

Calculations for obtaining the pixel values Pyx based on the output data $O^1{}_{ji}$ through $O^4{}_{ji}$ of each of the stages T1 through T4 will be described below.

Similar to equation (3) relating to the pixel value P00, the equation, by which the pixel value P07 is obtained based on the DCT coefficients Fvu, is as follows:

$$P07=\frac{1}{4}\cdot(F00\cdot c[4,4]+F04\cdot c[4,4]+F40\cdot c[4,4]+F44\cdot c[4,4])+$$

$$\frac{1}{4}\cdot(F02\cdot c[4,2]+F06\cdot c[4,6]+F42\cdot c[4,2]+F46\cdot c[4,6])+\frac{1}{4}\cdot(F20\cdot c[4,2]+F24\cdot c[4,2]+F60\cdot c[4,6]+F64\cdot c[4,6])+\frac{1}{4}\cdot(F22\cdot c[2,2]+F26\cdot c[2,6]+F62\cdot c[2,6]+F66\cdot c[6,6])+\frac{1}{4}\cdot(F10\cdot c[4,1]+F30\cdot c[4,3]+F50\cdot c[4,5]+F70\cdot c[4,7])+\frac{1}{4}\cdot(F14\cdot c[4,1]+F34\cdot c[4,3]+F54\cdot c[4,5]+F74\cdot c[4,7])+\frac{1}{4}\cdot(F12\cdot c[2,1]+F32\cdot c[2,3]+F52\cdot c[2,5]+F72\cdot c[2,7])+\frac{1}{4}\cdot(F16\cdot c[6,1]+F36\cdot c[6,3]+F56\cdot c[6,5]+F76\cdot c[6,7])+\frac{1}{4}\cdot(-F01\cdot c[4,1]-F03\cdot c[4,3]-F05\cdot c[4,5]-F07\cdot c[4,7])+\frac{1}{4}\cdot(-F41\cdot c[4,1]-F43\cdot c[4,3]-F45\cdot c[4,5]-F47\cdot c[4,7])+\frac{1}{4}\cdot(-F21\cdot c[2,1]-F23\cdot c[2,3]-F25\cdot c[2,5]-F27\cdot c[2,7])+\frac{1}{4}\cdot(-F61\cdot c[6,1]-F63\cdot c[6,3]-F65\cdot c[6,5]-F67\cdot c[6,7])+\frac{1}{4}\cdot(-F11\cdot c[1,1]-F35\cdot c[3,5]-F53\cdot c[3,5]-F77\cdot c[7,7])+\frac{1}{4}\cdot(-F17\cdot c[1,7]$$

Equation (3) can be expressed using $X_{00}1$ through $X_{00}16$, as follows:

$$P00=X_{00}1+X_{00}2+X_{00}3+X_{00}4+X_{00}5+X_{00}6+X_{00}7+X_{00}8+X_{00}9+X_{10}+X_{00}11+X_{00}12+X_{00}13+X_{00}14+X_{00}15+X_{00}16$$

The first through fourth terms are obtained in the first stage T1, and are $O^1{}_{00}$. The fifth through eighth terms are obtained in the second stage T2, and are $O^2{}_{00}$. The ninth through twelfth terms are obtained in the third stage T3, and are $O^3{}_{00}$. The thirteenth through sixteenth terms are obtained in the fourth stage T4, and are $O^4{}_{00}$. Namely, the pixel value P00 is obtained from the following equation:

$$P00=O^1{}_{00}+O^2{}_{00}+O^3{}_{00}+O^4{}_{00} \quad (18)$$

Equation (17) can be similarly expressed using $X_{00}1$ through $X_{00}16$, as follows:

$$P00=X_{00}1+X_{00}2+X_{00}3+X_{00}4+X_{00}5+X_{00}6+X_{00}7+X_{00}8-X_{00}9-X_{00}10-X_{00}11-X_{00}12-X_{00}13-X_{00}14-X_{00}15-X_{00}16$$

Namely, the pixel value P07 is obtained by $$P07=O^1{}_{00}+O^2{}_{00}-O^3{}_{00}-O^4{}_{00} \quad (19)$$

Similarly, the pixel value P70 is obtained by $$P70=O^1{}_{00}-O^2{}_{00}+O^3{}_{00}-O^4{}_{00} \quad (20)$$

The pixel value P77 is obtained by $$P77=O^1{}_{00}-O^2{}_{00}-O^3{}_{00}+O^4{}_{00} \quad (21)$$

Thus, the pixel values P00, P07, P70, and P77 of the first pixel group PA00 are obtained by the addition and subtraction of the output data $O^1{}_{00}$, $O^2{}_{00}$, $O^3{}_{00}$, and $O^4{}_{00}$. Similarly, the pixel values P01, P06, P71, and P76 of the second pixel group PA01 are obtained by the addition and subtraction of the output data $O^1{}_{01}$, $O^2{}_{01}$, $O^3{}_{01}$, and $O^4{}_{01}$. The plus and minus symbols of each of the output data are same as those of the equations (18) through (21). Regarding the other pixel groups, the pixel values Pyx are obtained by the addition and subtraction of the output data $O^1{}_{ji}$ through $O^4{}_{ji}$. The plus and minus symbols are the same as that of the first pixel group.

Figure 16:
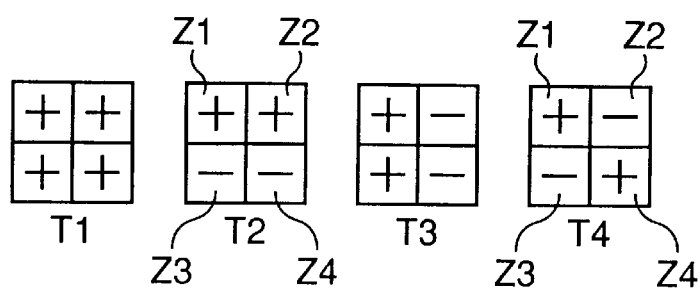
FIG. 16 is a view showing a relationship between the symbols used in the addition and subtraction for obtaining the pixel values Pyx and the output data of the each of the stages t1 through T4.

FIG. 16 shows a relationship between the symbol in the addition and subtraction for obtaining the pixel values Pyx and the output data $O^1{}_{ji}$ through $O^4{}_{ji}$ of each of the stages T1 through T4. In FIG. 16, the symbols marked by reference Z1 shown at the upper left portion, reference Z2 shown at the upper right portion, reference Z3 shown at the left and lower portion, and reference Z4 shown at the lower right portion correspond to the pixel values of the upper left portion, the pixel values of the upper right portion, the pixel values of the lower left portion, and the pixel values of the lower right portion of each of the groups of pixels shown in FIG. 13.

The number of multiplications in the post-processing unit N2 is 6 in the first stage T1, 24 in the second stage T2, 24 in the third stage T3, and 20 in the fourth stage T4, respectively, and the total number of the multiplications is 74. The number of multiplications in the pre-processing unit N1 is equal to the number of the quantized DCT coefficients, which is 64. Therefore, according to this embodiment, the number of multiplications, which is necessary to restore the pixel values Pyx from the quantized DCT coefficients, is 138.

Conversely, when this embodiment is not provided, 344 multiplications are needed in the IDCT as shown by equation (2), and 64 multiplications are needed in the quantization. Namely, the total number of multiplications is 408. Therefore, according to this embodiment, the number of multiplications is reduced to approximately one third of that necessary using a conventional method, so that time required to restore the pixel signals is shortened.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 7-293667 (filed on Oct. 16, 1995) which is expressly incorporated herein by reference, in its entirety.

What is claimed is:

1. An image processing device, in which a quantized discrete cosine transformation (DCT) coefficient is inversely-quantized and subjected to a two dimensional inverse discrete cosine transformation (IDCT) to restore each of a plurality of pixel values, and quantized DCT coefficient being obtained for each of a plurality of spatial frequencies by applying a two dimensional discrete cosine transformation (DCT) to original image data composed of said pixel values which are arranged in a matrix, and then quantizing the resultant two dimensional DCT coefficient using a quantization coefficient included in a quantization table, said device comprising:

a pre-processor, said pre-processor generating a pre-processed DCT coefficient by multiplying said quantized DCT coefficient by a pre-processed coefficient, said pre-processed coefficient comprising the multiplication product of said quantization coefficient and one of a plurality of different multiplying terms corresponding to one of a plurality of cosine coefficients used in said two dimensional IDCT, each cosine coefficient comprising two cosine values multiplied by each other according to a two-dimensional IDCT equation;

a post-processor which is classified into a plurality of stages in accordance with a value of said cosine coefficients, and in which a calculation corresponding to said value of said cosine coefficients is applied to said pre-processed DCT coefficient to obtain output data, the pre-processed DCT coefficient classified into one of a plurality of groups in accordance with a value of the cosine coefficients corresponding to the pre-processed DCT coefficient, each pre-processed DCT coefficient group being input to a respective one of the plurality of stages so that the calculation is applied to the pre-processed DCT coefficient; and a pixel value calculator, which classifies said plurality of pixel values into groups composed of a predetermined number of pixel values which are symmetrically disposed in said matrix and are multiplied by cosine coefficients having a same absolute value, and performs addition and subtraction operations regarding said output data included in each of said stages to restore said pixel values for each of said groups, wherein when said original image data are pixel values Pyx of an 8×8 pixel block, suffix "y" meaning a vertical position of said 8×8 pixel block, suffix "x" meaning a horizontal position of said 8×8 pixel block and said vertical and horizontal positions of 64 DCT coefficients Fvu, which are arranged in an 8×8 matrix, are indicated by parameters "v" and "u", respectively, said pixel values being $$Pyx = 1/4 \sum_{u=0}^{7} \sum_{v=0}^{7} Cu\, Cv\, Fvu * \cos\frac{(2x+1)u\prod}{16} * \cos\frac{(2y+1)v\prod}{16}$$

$$\text{wherein } Cu, Cv = 1/\sqrt{2} : u, v = 0$$
$$= 1 : u, v \neq 0$$

said post-processor comprising a first stage in which each of said parameters "u" and "v" is 0, 4, 2, or 6, a second stage in which said parameter "u" is 0, 4, 2, or 6 and said parameter "v" is 1, 3, 5, or 7, a third stage in which said parameter "u" is 1, 3, 5, or 7 and said parameter "v" is 0, 4, 2, or 6, and a fourth stage in which each of said parameters "u" and "v" is 1, 3, 5, or 7.

2. A device according to claim 1, wherein said first stage comprises a first area in which each of said parameters "u" and "v" is 0 or 4, a second area in which said parameter "u" is 2 or 6 and said parameter "v" is 0 or 4, or said parameter "u" is 0 or 4 and said parameter "v" is 2 or 6, and a third area in which each of said parameters "u" and "v" is 2 or 6.

3. A device according to claim 2, wherein said first area performs a first process corresponding to a multiplication in which each of said DCT coefficients Fvu is multiplied by $\cos(4\pi/16)\cdot\cos(4\pi/16)$.

4. A device according to claim 2, wherein said second area performs a second process corresponding to a multiplication in which each of said DCT coefficients Fvu is multiplied by $\cos(4\pi/16)\cdot\cos(2\pi/16)$, or $\cos(4\pi/16)\cdot\cos(6\pi/16)$.

5. A device according to claim 2, wherein said third area performs a third process corresponding to a multiplication in which each of said DCT coefficients FVU is multiplied by $\cos(2\pi/16)\cdot\cos(2\pi/16)$, $\cos(2\pi/16)\cdot\cos(6\pi/16)$, or $\cos(6\pi/16)\cdot\cos(6\pi/16)$.

6. A device according to claim 1, wherein said second stage comprises a fourth area in which said parameter "u" is 0 or 4 and said parameter "v" is 1, 3, 5, or 7, and a fifth area in which said parameter "u" is 2 or 6 and said parameter "v" is 1, 3, 5, or 7.

7. A device according to claim 6, wherein said fourth area performs a fourth process corresponding to a multiplication in which each of said DCT coefficients Fvu is multiplied by $\cos(4\pi/16)\cdot\cos(\pi/16)$, $\cos(4\pi/16)\cdot\cos(3\pi/16)$, $\cos(4\pi/16)\cdot\cos(5\pi/16)$, or $\cos(4\pi/16)\cdot\cos(7\pi/16)$.

8. A device according to claim 6, wherein said fifth area performs a fifth process corresponding to a multiplication in which each of said DCT coefficients Fvu is multiplied by $\cos(2\pi/16)\cdot\cos(\pi/16)$, $\cos(2\pi/16)\cdot\cos(3\pi/16)$, $\cos(2\pi/16)\cdot\cos(5\pi/16)$, $\cos(2\pi/16)\cdot\cos(7\pi/16)$, $\cos(6\pi/16)\cdot\cos(\pi/16)$, $\cos(6\pi/16)\cdot\cos(3\pi/16)$, $\cos(6\pi/16)\cdot\cos(5\pi/16)$, or $\cos(6\pi/16)\cdot\cos(7\pi/16)$.

9. A device according to claim 1, wherein said third stage comprises a fourth area in which said parameter "u" is 1, 3, 5, or 7 and said parameter "v" is 0 or 4, and a fifth area in which said parameter "u" is 1, 3, 5, or 7 and said parameter "v" is 2 or 6.

10. A device according to claim 9, wherein said fourth area area performs a fourth process corresponding to a multiplication in which each of said DCT coefficients Fvu is multiplied by $\cos(4\pi/16)\cdot\cos(\pi/16)$, $\cos(4\pi/16)\cdot\cos(3\pi/16)$, $\cos(4\pi/16)\cdot\cos(5\pi/16)$, or $\cos(4\pi/16)\cdot\cos(7\pi/16)$.

11. A device according to claim 9, wherein said fifth area area performs a fifth process corresponding to a muitiplication in which each of said DCT coefficients Fvu is multiplied by $\cos(2\pi/16)\cdot\cos(\pi/16)$, $\cos(2\pi/16)\cdot\cos(3\pi/16)$, $\cos(2\pi/16)\cdot\cos(5\pi/16)$, $\cos(2\pi/16)\cdot\cos(7\pi/16)$, $\cos(6\pi/16)\cdot\cos(\pi/16)$, $\cos(6\pi/16)\cdot\cos(3\pi/16)$, $\cos(6\pi/16)\cdot\cos(5\pi/16)$, or $\cos(6\pi/16)\cdot\cos(7\pi/16)$.

12. A device according to claim 1, wherein said fourth stage comprises a sixth area in which each of said parameters "u" and "v" is 1, 3, 5, or 7.

13. A device according to claim 12, wherein said sixth area performs a sixth process corresponding to a multiplication in which each of said DCT coefficients Fvu is multiplied by $\cos(\pi/16)\cdot\cos(\pi/16)$, $\cos(\pi/16)\cdot\cos(3\pi/16)$, $\cos(\pi/16)\cdot\cos(5\pi/16)$, $\cos(\pi/16)\cdot\cos(7\pi/16)$, $\cos(3\pi/16)\cdot\cos(3\pi/16)$, $\cos(3\pi/16)\cdot\cos(5\pi/16)$, $\cos(3\pi/16)\cdot\cos(7\pi/16)$, $\cos(5\pi/16)\cdot\cos(5\pi/16)$, $\cos(5\pi/16)\cdot\cos(7\pi/16)$, or $\cos(7\pi/16)\cdot\cos(7\pi/16)$.

14. A device according to claim 1, wherein a number of said pixel values included in each of said groups is four.

15. A device according to claim 14, wherein said original image data are pixel values Pyx of an 8×8 pixel block, suffix "y" means a vertical position of said 8×8 pixel block, and suffix "x" means a horizontal position of said 8×8 pixel block, and said pixel value calculation system classifies said pixel values into a first pixel group composed of P00, P07, P70, P77, a second pixel group composed of P01, P06, P71, P76, a third pixel group composed of P02, P05, P72, P75, a fourth pixel group composed of P03, P04, P73, P74, a fifth pixel group composed of P10, P17, P60, P67, a sixth pixel group composed of P11, P16, P61, P66, a seventh pixel group composed of P12, P15, P62, P65, an eighth pixel group composed of P13, P14, P63, P64, a ninth pixel group composed of P20, P27, P50, P57, a tenth pixel group composed of P21, P26, P51, P56, an eleventh pixel group composed of P22, P25, P52, P55, a twelfth pixel group composed of P23, P24, P53, P54, a thirteenth pixel group composed of P30, P37, P40, P47, a fourteenth pixel group composed of P31, P36, P41, P46, a fifteenth pixel group composed of P32, P35, P42, P45, a sixteenth pixel group composed of P33, P34, P43, P44.

16. A device according to claim 1 wherein the pre-processed coefficient comprises a quantization/multiplying term table of pre-processed coefficients obtained by multiplying the quantization coefficient and the multiplying-term, said quantization/multiplying term table comprising an arrangement of absolute values symmetric with regard to a horizontal axis of the quantization/multiplying term table.

17. An image processing device, in which a quantized discrete cosine transformation (DCT) coefficient is inversely-quantized and subjected to a two dimensional inverse discrete cosine transformation (IDCT) to restore each of a plurality of pixel values, and quantized DCT coefficient being obtained for each of a plurality of spatial frequencies by applying a two dimensional discrete cosine transformation (DCT) to original image data composed of said pixel values which are arranged in a matrix, and then quantizing the resultant two dimensional DCT coefficient using a quantization coefficient included in a quantization table, said device comprising:

pre-process means, said pre-process means generating a pre-processed DCT coefficient by multiplying said quantized DCT coefficient by a pre-processed coefficient, said pre-processed coefficient comprising the multiplication product of said quantization coefficient and one of a plurality of different multiplying terms corresponding to one of a plurality of cosine coefficients used in said two dimensional IDCT, each cosine coefficient comprising two cosine values multiplied by each other according to a two-dimensional IDCT equation;

post-process means for post-processing said pre-processed DCT coefficient to obtain output data, said post-process means being classified into a plurality of stages in accordance with a value of said cosine coefficients, said post-process means performing a calculation corresponding to said value of said cosine coefficients to said pre-processed DCT coefficient to obtain said output data, the pre-processed DCT coefficient classified into one of a plurality of groups in accordance with a value of the cosine coefficients corresponding to the pre-processed DCT coefficient, each pre-processed DCT coefficient group being input to a respective one of the plurality of stages so that the calculation is applied to the pre-processed DCT coefficient; and pixel value calculation means for calculating to restore said pixel values for each of said groups, said pixel value calculation means classifying said pixel values into groups composed of a predetermined number of pixel values which are symmetrically disposed in said matrix and are multiplied by said cosine coefficient having the same absolute values, and performing addition and subtraction operations regarding said output data included in each of said stages in order to restore said pixel values for each of said group, wherein when said original image data are pixel values Pyx of an 8×8 pixel block, suffix "y" meaning a vertical position of said 8×8 pixel block, suffix "x" meaning a horizontal position of said 8×8 pixel block and said vertical and horizontal positions of 64 DCT coefficients Fvu, which are arranged in an 8×8 matrix, are indicated by parameters "v" and "u", respectively. said pixel values being $$Pyx = 1/4 \sum_{u=0}^{7} \sum_{v=0}^{7} Cu\, Cv\, Fvu * \cos\frac{(2x+1)u\Pi}{16} * \cos\frac{(2y+1)v\Pi}{16}$$

wherein $Cu, Cv = 1/\sqrt{2} : u, v = 0$
$= 1 : u, v \neq 0$ said post-process means comprising a first stage in which each of said parameters "u" and "v" is 0, 4, 2, or 6, a second stage in which said parameter "u" is 0, 4, 2, or 6 and said parameter "v" is 1, 3, 5, or 7, a third stage in which said parameter "u" is 1, 3, 5, or 7 and said parameter "v" is 0, 4, 2, or 6, and a fourth stage in which each of said parameters "u" and "v" is 1, 3, 5, or 7.

* * * * *